United States Patent [19]
Prüss

[11] Patent Number: 5,435,455
[45] Date of Patent: Jul. 25, 1995

[54] LOCKING DEVICE

[75] Inventor: Ludwig Prüss, Braunschweig, Germany

[73] Assignee: Volkswagon AG, Wolfsburg, Germany

[21] Appl. No.: 855,686

[22] PCT Filed: Dec. 20, 1990

[86] PCT No.: PCT/EP90/02275
  § 371 Date: May 6, 1992
  § 102(e) Date: May 6, 1992

[87] PCT Pub. No.: WO91/10071
  PCT Pub. Date: Jul. 11, 1991

[30] Foreign Application Priority Data
  Dec. 22, 1989 [DE] Germany ............ 39 42 526.6

[51] Int. Cl.[6] .................................. B65D 41/32
[52] U.S. Cl. ........................................ 220/307
[58] Field of Search ................... 220/307, 306, 308; 215/250, 355

[56] References Cited
U.S. PATENT DOCUMENTS

| | | | |
|---|---|---|---|
| 3,023,925 | 3/1962 | Sher | 220/307 |
| 3,385,466 | 5/1968 | Hook et al. | 220/307 |
| 3,893,487 | 7/1975 | Engelking | 138/89 |
| 4,627,597 | 12/1986 | Brausfeld et al. | 251/129 |
| 4,787,795 | 11/1988 | Kraus | 411/510 |
| 4,981,310 | 1/1991 | Belisaire | 285/162 |

FOREIGN PATENT DOCUMENTS
0325898  10/1988  European Pat. Off. .

OTHER PUBLICATIONS
Siegfried Hildebrand, *Feinmechanische Bauelemente.* Carl Hanser Verlag München Wien, 1978, pp. 243–244.

*Primary Examiner*—Joseph Man-Fu Moy
*Attorney, Agent, or Firm*—Brumbaugh, Graves, Donohue & Raymond

[57] ABSTRACT

In the disclosed locking plug arrangement, a locking plug consists of a cylindrical body molded from synthetic material and having an integral peripheral sealing lip and one or more integral laterally projecting catches and a cast housing with a bore to receive the plug body in sealing relation and with a transverse passage to receive a projecting catch.

18 Claims, 2 Drawing Sheets

LOCKING DEVICE

BACKGROUND OF THE INVENTION

This invention relates to a locking plug arrangement using a plug which may be releasably locked in a bore.

In fluid control technology, plugs are used which are shaped to provide an abutment for a control piston movable in a bore, and which also seal the bore against escape of hydraulic fluid. Conventional plugs of this type may be positively locked with respect to a housing containing the bore, even under high dynamic loads, by devices such as bolts, pins or locking rings. A disadvantage of this type of locking plug, however, is the large number of structural details required as well as the high cost of manufacturing and assembly, especially in connection with arrangements for removing the plug.

SUMMARY OF THE INVENTION

Accordingly, it is an object of the present invention to provide a locking plug arrangement using a releasable locking plug which overcomes the disadvantages of the prior art.

Another object of the invention is to provide a locking plug which can be easily installed and removed, but is positively fixed in position even under high dynamic loads.

These and other objects of the invention are attained by providing a locking plug having a body with an outer surface adapted to be received in sealing relation in a bore and having a catch member projecting from the body which is arranged to be received in a passage extending transversely to the axis of the bore. A locking plug arrangement according to the invention may be mass produced by making the plug from an injectable synthetic material and making a die-cast housing to receive the plug. In this way, all of the necessary elements of the locking arrangement may be provided during the formation of the plug and the housing so that no machining will be required. By making the plug in the form of a hollow cylinder, the amount of material required can be reduced, providing economic advantages.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
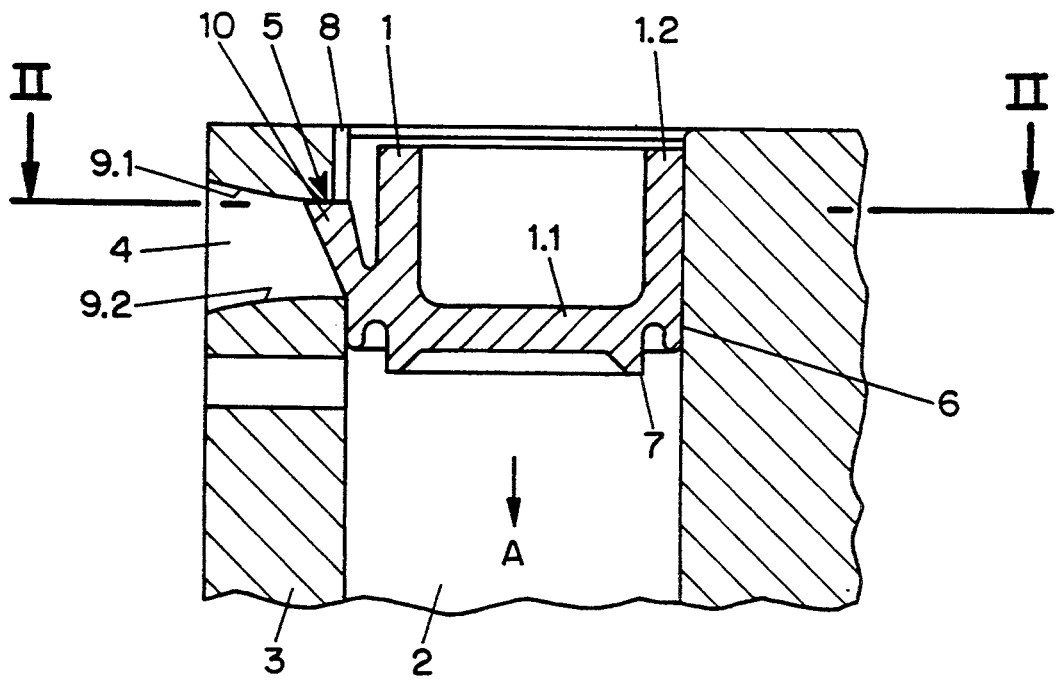
FIG. 1 is a longitudinal sectional view illustrating a representative embodiment of the invention in which a locking plug is received and locked in a housing bore.
Figure 2:
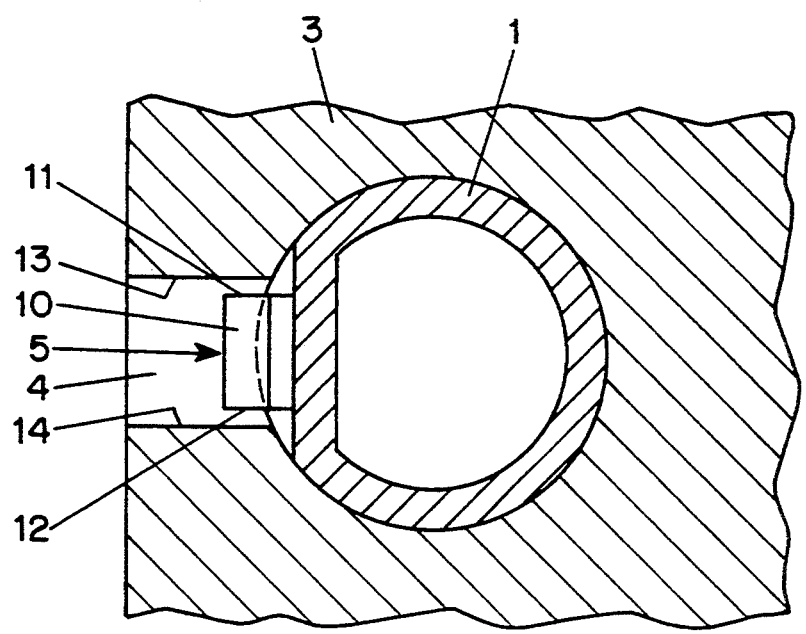
FIG. 2 is a sectional view of the locking plug arrangement shown in FIG. 1, taken along line II—II and looking in the direction of the arrows.

In the typical embodiment shown in FIGS. 1 and 2, a locking plug 1, in the shape of a hollow cylinder, has a closed end 1.1 and a cylindrical outer wall 1.2 which is in contact with a wall of a bore 2 in a housing 3. The housing 3 may, for example, be part of a valve box for a fluid control system, and may be formed as a die casting. A passage 4 is formed in the housing 3 substantially perpendicular to the centerline of the bore 2 and a catch member 5, projecting outwardly from the cylindrical outer wall 1.2 of the locking plug 1 and capable of being bent resiliently toward the cylindrical outer wall 1.2, is received in the passage 4. In addition, the plug 1 has a sealing lip 6 engaging the bore 2 and an annular shoulder 7, which may, for example, be an abutment for a control system movable in the bore 2 (not shown). Also cast into the housing 3 are a longitudinal groove 8 extending along the bore 2 as far as the passage opening 4, and two abutment surfaces 9.1 and 9.2 in the opening 4. In the locked condition of the plug, an abutment surface 10 at the end of the catch member 5 engages the surface 9.1 essentially in area contact therewith and hence is not subject to wear.

Two lateral surfaces 11 and 12 of the catch member 5, visible in the cross-sectional view of FIG. 2, are confined by two side walls 13 and 14 of the passage opening 4 to restrain the plug 1 against rotation in the locked condition. The clearance between the lateral surfaces 11 and 12 and the side walls 13 and 14 is selected so that the catch member 5 can move into the passage opening 4 without difficulty.

The embodiment illustrated in FIGS. 1 and 2 is especially easy to assemble. The plug 1 is first placed in the open end of the bore 2 so that the catch member 5 is aligned with the longitudinal groove 8. Then the plug 1 is pushed into the bore 2 in the direction of the arrow so that the catch member 5 is resiliently bent toward the cylindrical outer wall 1.2 of the plug until the abutment surface 10 of the member 5 has been moved past the surface 9.1 of the passage 4. This insertion motion in the direction of the arrow A is terminated by contact of the catch member 5 with the edge of the abutment surface 9.2 at the bore 2. At that point, the catch member 5 will spring outwardly to the position shown in FIG. 1 and will lodge in the passage 4. The plug 1 is then positively fixed both axially and angularly in the bore 2 by the catch member 5. It should be emphasized that the insertion of the locking plug 1 in the bore 2 can be accomplished by hand without requiring any special tools. Moreover, the assembly operation may also be automated with very low equipment cost.

Furthermore, the plug 1 can be removed from the bore 2 without difficulty. For that purpose, a mandrel- or rod-like tool (not shown) may be inserted in the passage 4 to push the catch member 5 toward the cylindrical outer wall 1.2 far enough so that it can enter the longitudinal groove 8. In this way, the plug 1 is released from its locked position in the bore 2. By inserting the mandrel- or rod-like tool at an upward angle, axial motion of the plug will be produced in the direction opposite to the arrow A as the catch member 5 is depressed. This facilitates release and removal of the plug 1 from the bore 2. In an especially advantageous embodiment, the sides of the longitudinal groove 8 are flush with the side walls 13 and 14 of the passage 4 so that the catch member 5 need be depressed only as far as the base of the lengthwise groove 8 in order to release the plug 1.

Further ease of assembly is provided by the presence of the sealing lip 6 which, by itself, forms the seal between the plug 1 and the bore 2. Consequently, the cylindrical outer wall 1.2 may be dimensioned to provide a loose fit with respect to the diameter of the bore 2, thereby greatly reducing friction between plug 1 and housing 3 both upon insertion and upon removal of the plug 1. To enhance the sealing effect of the plug 1, an O-ring may be inserted between the annular shoulder 7 and the sealing lip 6 to bias the sealing lip 6 against the wall of the bore 2.

Figure 3:
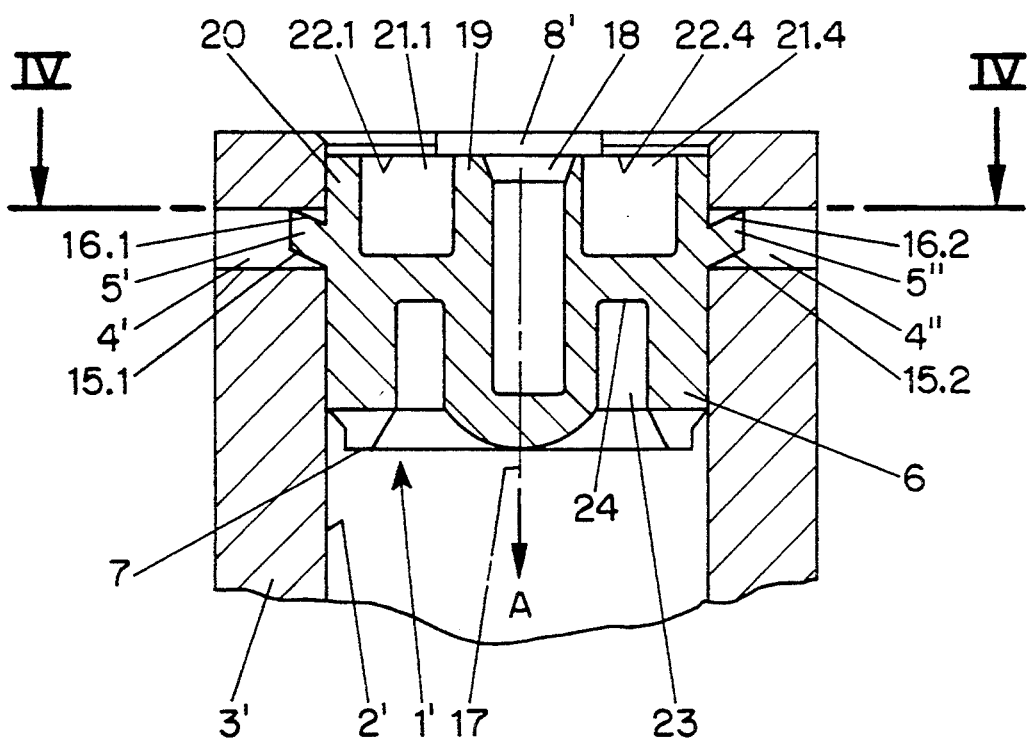
FIG. 3 is a longitudinal sectional view of a second representative embodiment of the invention showing a locking plug received and locked in a housing bore.
Figure 4:
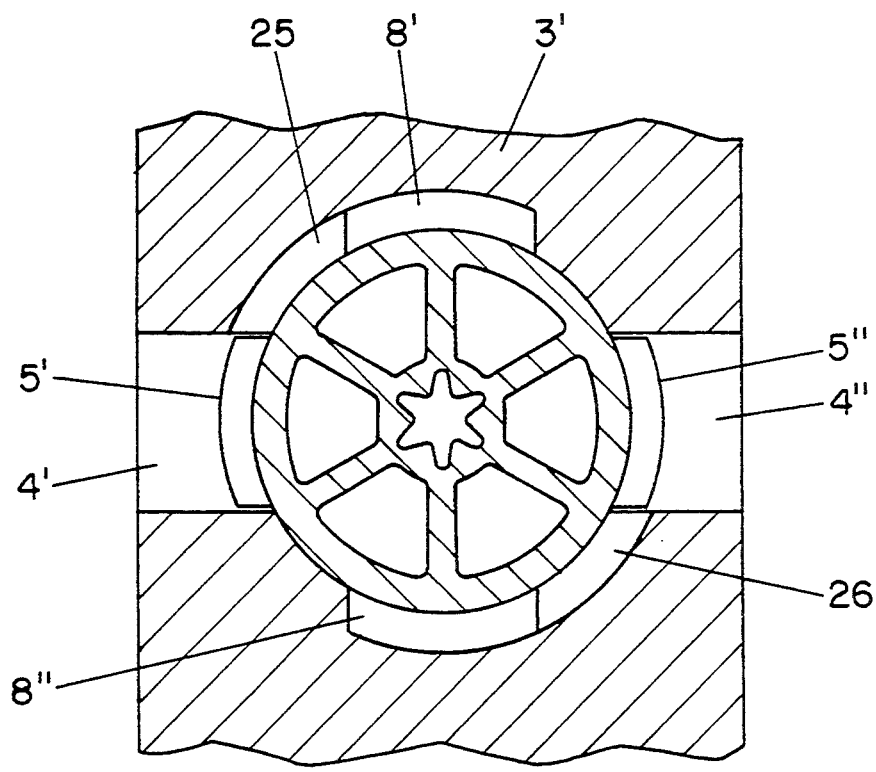
FIG. 4 is a sectional view of the embodiment shown in FIG. 3, taken along the line IV—IV and looking in the direction of the arrows.

In the embodiment shown in FIGS. 3 and 4, a plug 1' is inserted in a bore 2' of a housing 3'. Two opposed passages 4' and 4" are cast in the housing 3' and two catch members 5' and 5", formed as lugs on the plug 1' are received in those passages. Each of the catch members 5' and 5" is provided with a lower inclined surface 15.1 and 15.2, respectively, and an upper inclined surface 16.1 and 16.2, respectively. The lower inclined surfaces 15.1 and 15.2 should preferably form an angle of about 55°–65° with the axis 17 of the plug 1' and the upper inclined surfaces 16.1 and 16.2 should preferably have an angle of about 87°–89° with the axis 17, which has been exaggerated in the drawing for the sake of clarity The plug 1', similar to plug 1, has a peripheral sealing lip 6 in sealing engagement with the bore 2' and an annular shoulder 7. In addition, the plug 1' is formed with a polygonal aperture 18 in an inner shell 19 into which a correspondingly shaped assembly tool may be inserted to rotate the plug 1'. For economy of material, a series of recesses 21.1–21.6, separated by webs 22.1–22.6, is formed at one end of the plug between the inner shell 19 and an outer shell 20, only two recesses 21.1 and 21.4 and two webs 22.1 and 22.4 being visible in the sectional view of FIG. 3. At the other end of the plug, an annular groove 23 with a continuous base 24 which may, for example, receive a spring (not shown) is formed between the inner shell 19 and the outer shell 20. Especially important to the operation of this locking device are two longitudinal grooves 8' and 8" formed along the bore 2' in the housing 3' (only one being visible in FIG. 3) which extend to the level of the bottom edge of the passages 4' and 4".

For better understanding of the operation of this embodiment, FIG. 4 additionally shows two partial annular grooves 25 and 26 through which the catch members 5' and 5" of the plug 1' may be rotated out of the longitudinal grooves 8' and 8" to the passages 4' and 4" after the plug 1' has been moved far enough into the bore 2'. With the aid of a simple tool inserted in the aperture 18, the plug 1' can thus be installed by a pushing and turning motion, and may be removed by a turning and pulling motion. Since the plug is locked in the bore in this manner, the catch members 5' and 5" need not be resilient and may be substantially rigid.

If desired, an embodiment of the type shown in FIGS. 3 and 4 could be arranged with a locking plug having only one catch member or more than two catch members. The provision of upper inclined surfaces 16.1 on the holding members 5' and 5" has the advantage that, when the plug 1' is locked and is forced in the direction opposite to the direction of the arrow A, the inclined surfaces engage the upper wall of the passages 4' and 4". Thus, after the motion to the locking position has been completed, those surfaces of the catch members 5' and 5" may be pressed against the upper walls of the passages 4' and 4", so that the stress applied by the plug is distributed over a greater area. This is especially favorable in prolonging the service life of the plug.

Because the plug is shaped substantially as a hollow cylinder, a considerable saving of material is realized in the mass production of plugs according to the invention. Furthermore, the wall thicknesses of the plugs 1 and 1' are dimensioned so that optimal flow conditions are achieved when the plugs are injection molded from synthetic material. Manufacture of the locking arrangement comprising the injection molded locking plug and the die cast housing requires no machining or other costly operations. Economic advantages result not only from simplified assembly but also from savings of material and reduced cost of production, especially for the embodiments shown in the drawings.

Although the invention has been described herein with reference to specific embodiments, many modifications and variations therein will readily occur to those skilled in the art. Accordingly, all such variations and modifications are included within the intended scope of the invention.

I claim:

1. A sealing plug to be inserted into and locked in a bore of a housing having a passage extending transverse to the bore and located inwardly from an open end of the bore comprising a plug body having catch means projecting from the plug body to be received in the transverse passage and having a peripheral sealing surface located inwardly from the catch means in the direction of plug insertion for sealing engagement with the bore at a location inwardly in the bore from the transverse passage, the sealing surface further including means for biasing the sealing surface to engage the bore surface.

2. A sealing plug according to claim 1 wherein the plug body is in the form of a hollow cylinder with a closed end and has an encircling sealing lip adjacent to the closed end of the hollow cylinder.

3. A sealing plug according to claim 1 wherein the plug body is substantially a hollow cylinder closed at one end.

4. A sealing plug according to claim 1 wherein the plug sealing surface is integral with the plug body.

5. A sealing plug according to claim 1 wherein the plug is made from an injection-moldable synthetic material.

6. A sealing plug according to claim 1 wherein the catch means is an integral part of the plug body and is arranged to lock the plug in both angular and longitudinal directions in the bore.

7. A sealing plug according to claim 1 wherein the catch means is resilient.

8. A sealing plug according to claim 7 wherein the plug body has a cylindrical outer wall and wherein the catch means includes a catch member normally projecting outwardly at an angle from the cylindrical outer wall of the plug body and the resilience of the catch means permits motion of the member from its normal position toward the cylindrical outer wall.

9. A locking arrangement comprising a sealing plug to be inserted into and locked in a bore of a housing having a passage extending transverse to the bore and located inwardly from an open end of the bore including a plug body having catch means projecting from the plug body to be received in the transverse passage and having a peripheral sealing surface located inwardly from the catch means in the direction of plug insertion for fluid-sealing engagement with the bore at a location inwardly in the bore from the transverse passage, and a cast housing having a bore and a transverse passage cast into the housing to receive the locking plug body and the catch means, respectively.

10. A locking arrangement according to claim 9 wherein the cross-sectional configuration of the transverse passage adjacent to the bore is arranged to receive the catch means with a predetermined clearance in the angular direction.

11. A locking arrangement according to claim 10 wherein the plug body has a cylindrical outer wall and wherein the catch means includes a catch member normally projecting outwardly at an angle from the cylindrical outer wall of the plug body and is resilient to permit motion from its normal position toward the cylindrical outer wall and wherein the free end of the catch member has a surface area which engages a wall of the transverse passage to retain the plug body in axially fixed position in the bore.

12. A locking arrangement according to claim 9 wherein catch means is resilient and wherein the housing bore includes a cast longitudinal groove extending from one end of the bore at least to the transverse passage so that, when the plug is pressed into the bore, the catch means is received in and guided by the groove until it reaches the transverse passage where it is resiliently moved into the passage.

13. A sealing plug according to claim 1 wherein the plug body has a closed end and includes an annular projection at the end inserted into the bore.

14. A sealing plug according to claim 1 wherein the plug body has a cylindrical outer wall and wherein the catch means comprises a substantially rigid catch member projecting outwardly from the cylindrical outer wall of the plug.

15. A sealing plug according to claim 14 wherein the forward and rear sides of the catch member with respect to the direction of the motion of plug insertion extend from the plug body at an angle toward the rear of the plug body.

16. A sealing plug according to claim 14 wherein the plug body has a polygonal aperture acessible from the rear end of the plug with respect to the direction of motion of plug insertion.

17. A sealing plug according to claim 16, wherein the plug body includes an inner shell and an outer shell connected by ribs and wherein the polygonal aperture is in the inner shell of the plug body.

18. A sealing arrangement including a locking plug according to claim 14 and a cast housing having a bore and a transverse passage cast into the housing and having a cast longitudinal groove extending along the bore from one end at least to the region of the transverse passage to guide the catch means, the groove being angularly offset from the location of the passage and connected thereto by at least a segment of a cast-in annular groove.

* * * * *

UNITED STATES PATENT AND TRADEMARK OFFICE
CERTIFICATE OF CORRECTION

PATENT NO. : 5,435,455
DATED : July 25, 1995
INVENTOR(S) : Ludwig Prüss

It is certified that error appears in the above-indentified patent and that said Letters Patent is hereby corrected as shown below:

<u>Column 6, line 17</u>, "A sealing arrangement including a locking plug" should read --A locking arrangement including a sealing plug--.

Signed and Sealed this

Thirtieth Day of January, 1996

Attest:

BRUCE LEHMAN

*Attesting Officer*        *Commissioner of Patents and Trademarks*